United States Patent
Goel

(10) Patent No.: US 9,118,927 B2
(45) Date of Patent: Aug. 25, 2015

(54) SUB-PIXEL INTERPOLATION AND ITS APPLICATION IN MOTION COMPENSATED ENCODING OF A VIDEO SIGNAL

(75) Inventor: Anurag Goel, Haryana (IN)

(73) Assignee: NVIDIA CORPORATION, Santa Clara, CA (US)

( * ) Notice: Subject to any disclaimer, the term of this patent is extended or adjusted under 35 U.S.C. 154(b) by 1522 days.

(21) Appl. No.: 11/762,091

(22) Filed: Jun. 13, 2007

(65) Prior Publication Data

US 2008/0310509 A1 Dec. 18, 2008

(51) Int. Cl.
| H04B 1/66 | (2006.01) |
| H04N 19/523 | (2014.01) |
| H04N 19/176 | (2014.01) |
| H04N 19/147 | (2014.01) |
| H04N 19/61 | (2014.01) |
| H04N 19/117 | (2014.01) |
| H04N 19/182 | (2014.01) |
| H04N 19/82 | (2014.01) |

(52) U.S. Cl.
CPC ........... *H04N 19/523* (2014.11); *H04N 19/117* (2014.11); *H04N 19/147* (2014.11); *H04N 19/176* (2014.11); *H04N 19/182* (2014.11); *H04N 19/61* (2014.11); *H04N 19/82* (2014.11)

(58) Field of Classification Search
CPC ..... H04N 19/523; H04N 19/61; H04N 19/82; H04N 19/147; H04N 19/176; H04N 19/117; H04N 19/182
USPC ..................................................... 375/240.17
See application file for complete search history.

(56) References Cited

U.S. PATENT DOCUMENTS

| 3,679,821 A | 7/1972 | Schroeder |
| 4,177,514 A | 12/1979 | Rupp |
| 4,583,164 A | 4/1986 | Tolle |
| 4,591,979 A | 5/1986 | Iwashita |
| 4,644,461 A | 2/1987 | Jennings |
| 4,755,810 A | 7/1988 | Knierim |
| 4,814,978 A | 3/1989 | Dennis |
| 4,992,857 A | 2/1991 | Williams |
| 5,045,940 A | 9/1991 | Peters et al. |
| 5,130,797 A | 7/1992 | Murakami et al. |

(Continued)

FOREIGN PATENT DOCUMENTS

| CN | 1489391 | 4/2004 |
| EP | 1283640 | 2/2003 |

(Continued)

OTHER PUBLICATIONS

Kadono Shinya, et. Al. Revised edition H. 264/AVC Textbook, Impress R&D, Jan. 1, 2006, pp. 131-133.

(Continued)

*Primary Examiner* — Michael Pyzocha

(57) ABSTRACT

Reducing computational complexity when generating sub-pixel values for sub-pixel motion estimation from integer pixels. In an embodiment, half pixels in vertical and horizontal directions are computed by a applying a filter of first complexity on integer pixels, and a half pixel in diagonal direction is computed using a filter of lower complexity as compared to the filter of first complexity. Quarter (and other lower resolution pixels) pixels may also be generated using the half pixel in the diagonal direction. Thus, overall computational complexity is reduced in generating sub-pixels for sub-pixel motion estimation.

9 Claims, 11 Drawing Sheets

(56) References Cited

U.S. PATENT DOCUMENTS

| | | |
|---|---|---|
| 5,146,324 A | 9/1992 | Miller et al. |
| 5,212,742 A | 5/1993 | Normile et al. |
| 5,225,875 A | 7/1993 | Shapiro et al. |
| 5,233,689 A | 8/1993 | Rhoden et al. |
| 5,267,334 A | 11/1993 | Normille et al. |
| 5,267,344 A | 11/1993 | Nelson, III |
| 5,369,744 A | 11/1994 | Fukushima et al. |
| 5,371,896 A | 12/1994 | Gove et al. |
| 5,596,369 A | 1/1997 | Chau |
| 5,598,514 A | 1/1997 | Purcell et al. |
| 5,608,652 A | 3/1997 | Astle |
| 5,613,146 A | 3/1997 | Gove et al. |
| 5,623,311 A | 4/1997 | Phillips et al. |
| 5,630,033 A | 5/1997 | Purcell et al. |
| 5,646,692 A | 7/1997 | Bruls |
| 5,657,465 A | 8/1997 | Davidson et al. |
| 5,768,429 A | 6/1998 | Jabbi et al. |
| 5,790,881 A | 8/1998 | Nguyen |
| 5,809,538 A | 9/1998 | Pollmann et al. |
| 5,821,886 A | 10/1998 | Son |
| 5,845,083 A | 12/1998 | Hamadani et al. |
| 5,870,310 A | 2/1999 | Malladi |
| 5,883,823 A | 3/1999 | Ding |
| 5,889,949 A | 3/1999 | Charles |
| 5,898,881 A | 4/1999 | Miura et al. |
| 5,909,224 A | 6/1999 | Fung |
| 5,923,375 A | 7/1999 | Pau |
| 5,954,786 A | 9/1999 | Volkonsky |
| 5,969,728 A | 10/1999 | Dye et al. |
| 5,999,220 A | 12/1999 | Washino |
| 6,035,349 A | 3/2000 | Ha et al. |
| 6,073,185 A | 6/2000 | Meeker |
| 6,088,355 A | 7/2000 | Mills et al. |
| 6,098,174 A | 8/2000 | Baron et al. |
| 6,104,470 A | 8/2000 | Streefkerk et al. |
| 6,144,362 A | 11/2000 | Kawai |
| 6,148,109 A | 11/2000 | Boon et al. |
| 6,157,751 A | 12/2000 | Olson et al. |
| 6,175,594 B1 | 1/2001 | Strasser et al. |
| 6,188,799 B1 | 2/2001 | Tan et al. |
| 6,195,389 B1 | 2/2001 | Rodriguez et al. |
| 6,222,883 B1 | 4/2001 | Murdock et al. |
| 6,269,174 B1 | 7/2001 | Koba et al. |
| 6,272,281 B1 | 8/2001 | De Vos et al. |
| 6,305,021 B1 | 10/2001 | Kim |
| 6,311,204 B1 | 10/2001 | Mills |
| 6,317,124 B2 | 11/2001 | Reynolds |
| 6,356,945 B1 | 3/2002 | Shaw et al. |
| 6,360,234 B2 | 3/2002 | Jain et al. |
| 6,418,166 B1 | 7/2002 | Wu et al. |
| 6,459,738 B1 | 10/2002 | Wu et al. |
| 6,539,060 B1 | 3/2003 | Lee et al. |
| 6,539,120 B1 | 3/2003 | Sita et al. |
| 6,560,629 B1 | 5/2003 | Harris |
| 6,647,062 B2 | 11/2003 | Mackinnon |
| 6,665,346 B1 | 12/2003 | Lee et al. |
| 6,687,788 B2 | 2/2004 | Vorbach et al. |
| 6,690,835 B1 | 2/2004 | Brockmeyer et al. |
| 6,690,836 B2 | 2/2004 | Natarajan et al. |
| 6,708,246 B1 | 3/2004 | Ishihara et al. |
| 6,721,830 B2 | 4/2004 | Vorbach et al. |
| 6,751,721 B1 | 6/2004 | Webb, Jr. et al. |
| 6,760,478 B1 | 7/2004 | Adiletta et al. |
| 6,782,052 B2 | 8/2004 | Sun et al. |
| 6,799,192 B1 | 9/2004 | Handley |
| 6,807,317 B2 | 10/2004 | Mathew et al. |
| 6,823,443 B2 | 11/2004 | Horiyama et al. |
| 6,950,473 B2 | 9/2005 | Kim et al. |
| 6,968,008 B1 * | 11/2005 | Ribas-Corbera et al. .................. 375/240.16 |
| 6,993,639 B2 | 1/2006 | Schlansker et al. |
| 6,996,645 B1 | 2/2006 | Wiedenman et al. |
| 7,038,687 B2 | 5/2006 | Booth, Jr. et al. |
| 7,095,783 B1 | 8/2006 | Sotheran et al. |
| 7,173,631 B2 | 2/2007 | Anderson |
| 7,260,148 B2 | 8/2007 | Sohm |
| 7,277,101 B2 | 10/2007 | Zeng |
| 7,289,672 B2 | 10/2007 | Sun et al. |
| 7,379,501 B2 | 5/2008 | Lainema |
| 7,394,284 B2 | 7/2008 | Vorbach |
| 7,403,564 B2 | 7/2008 | Laksono |
| 7,450,640 B2 | 11/2008 | Kim et al. |
| 7,499,491 B2 * | 3/2009 | Lee et al. .................. 375/240.12 |
| 7,548,586 B1 | 6/2009 | Mimar |
| 7,548,596 B2 | 6/2009 | Yen et al. |
| 7,551,671 B2 | 6/2009 | Tyldesley et al. |
| 7,565,077 B2 | 7/2009 | Rai et al. |
| 7,581,076 B2 | 8/2009 | Vorbach |
| 7,581,182 B1 | 8/2009 | Herz |
| 7,630,097 B2 | 12/2009 | Kodama et al. |
| 7,689,000 B2 | 3/2010 | Kazama |
| 7,693,219 B2 | 4/2010 | Yan |
| 7,720,311 B1 | 5/2010 | Sriram |
| 7,721,069 B2 | 5/2010 | Ramchandran et al. |
| 7,924,923 B2 | 4/2011 | Lee et al. |
| 7,996,827 B2 | 8/2011 | Vorbach et al. |
| 8,009,923 B2 | 8/2011 | Li et al. |
| 8,265,151 B1 * | 9/2012 | Wang et al. .................. 375/240.13 |
| 8,369,402 B2 | 2/2013 | Kobayashi et al. |
| 8,660,182 B2 | 2/2014 | Zhong et al. |
| 8,724,702 B1 | 5/2014 | Bulusu et al. |
| 8,731,071 B1 | 5/2014 | Kimura |
| 8,756,482 B2 | 6/2014 | Goel |
| 2001/0020941 A1 | 9/2001 | Reynolds |
| 2001/0024448 A1 | 9/2001 | Takase et al. |
| 2001/0028353 A1 | 10/2001 | Cheng |
| 2001/0028354 A1 | 10/2001 | Cheng et al. |
| 2002/0015445 A1 | 2/2002 | Hashimoto |
| 2002/0015513 A1 | 2/2002 | Ando et al. |
| 2002/0025001 A1 | 2/2002 | Ismaeil et al. |
| 2002/0041626 A1 | 4/2002 | Yoshioka et al. |
| 2002/0109790 A1 | 8/2002 | Mackinnon |
| 2002/0114394 A1 | 8/2002 | Ma |
| 2002/0118743 A1 | 8/2002 | Jiang |
| 2003/0020835 A1 | 1/2003 | Petrescu |
| 2003/0048361 A1 | 3/2003 | Safai |
| 2003/0078952 A1 | 4/2003 | Kim et al. |
| 2003/0141434 A1 | 7/2003 | Ishikawa et al. |
| 2003/0161400 A1 | 8/2003 | Dinerstein et al. |
| 2004/0057523 A1 | 3/2004 | Koto et al. |
| 2004/0095998 A1 | 5/2004 | Luo et al. |
| 2004/0100466 A1 | 5/2004 | Deering |
| 2004/0150841 A1 | 8/2004 | Lieberman et al. |
| 2004/0156435 A1 | 8/2004 | Itoh et al. |
| 2004/0174998 A1 | 9/2004 | Youatt et al. |
| 2004/0181564 A1 | 9/2004 | MacInnis et al. |
| 2004/0181800 A1 | 9/2004 | Rakib et al. |
| 2004/0190613 A1 | 9/2004 | Zhu et al. |
| 2004/0190617 A1 | 9/2004 | Shen et al. |
| 2004/0202245 A1 | 10/2004 | Murakami et al. |
| 2004/0213348 A1 | 10/2004 | Kim et al. |
| 2004/0218626 A1 | 11/2004 | Tyldesley et al. |
| 2004/0218675 A1 | 11/2004 | Kim et al. |
| 2004/0228415 A1 | 11/2004 | Wang |
| 2004/0257434 A1 | 12/2004 | Davis et al. |
| 2004/0268088 A1 | 12/2004 | Lippincott et al. |
| 2005/0008254 A1 | 1/2005 | Ouchi et al. |
| 2005/0033788 A1 | 2/2005 | Handley |
| 2005/0047502 A1 * | 3/2005 | McGowan .................. 375/240.01 |
| 2005/0066205 A1 | 3/2005 | Holmer |
| 2005/0079914 A1 | 4/2005 | Kaido et al. |
| 2005/0105618 A1 | 5/2005 | Booth et al. |
| 2005/0111548 A1 * | 5/2005 | Lee et al. .................. 375/240.12 |
| 2005/0123040 A1 * | 6/2005 | Bjontegard .................. 375/240.12 |
| 2005/0190976 A1 | 9/2005 | Todoroki et al. |
| 2005/0238102 A1 | 10/2005 | Lee et al. |
| 2005/0238103 A1 | 10/2005 | Subramaniyan et al. |
| 2005/0265447 A1 | 12/2005 | Park |
| 2005/0265454 A1 * | 12/2005 | Muthukrishnan et al. .................. 375/240.16 |
| 2005/0276493 A1 | 12/2005 | Xin et al. |
| 2005/0281337 A1 | 12/2005 | Kobayashi et al. |
| 2005/0286630 A1 | 12/2005 | Tong et al. |
| 2006/0002466 A1 | 1/2006 | Park |

(56) References Cited

U.S. PATENT DOCUMENTS

| | | | |
|---|---|---|---|
| 2006/0017802 A1 | 1/2006 | Yoo et al. | |
| 2006/0056513 A1 | 3/2006 | Shen et al. | |
| 2006/0056708 A1 | 3/2006 | Shen et al. | |
| 2006/0109910 A1* | 5/2006 | Nagarajan | 375/240.17 |
| 2006/0115001 A1 | 6/2006 | Wang et al. | |
| 2006/0133501 A1 | 6/2006 | Lee et al. | |
| 2006/0133506 A1* | 6/2006 | Dang | 375/240.17 |
| 2006/0176299 A1 | 8/2006 | Subbalakshmi et al. | |
| 2006/0176962 A1 | 8/2006 | Arimura et al. | |
| 2006/0203916 A1 | 9/2006 | Chandramouly et al. | |
| 2006/0291563 A1* | 12/2006 | Park et al. | 375/240.17 |
| 2007/0002945 A1 | 1/2007 | Kim | |
| 2007/0002950 A1 | 1/2007 | Yang | |
| 2007/0036215 A1 | 2/2007 | Pan et al. | |
| 2007/0070080 A1* | 3/2007 | Graham et al. | 345/589 |
| 2007/0133689 A1 | 6/2007 | Park et al. | |
| 2007/0171981 A1 | 7/2007 | Qi | |
| 2007/0217506 A1 | 9/2007 | Yang et al. | |
| 2007/0230564 A1 | 10/2007 | Chen et al. | |
| 2007/0274389 A1 | 11/2007 | Kim et al. | |
| 2007/0286284 A1* | 12/2007 | Ito et al. | 375/240.16 |
| 2007/0286508 A1* | 12/2007 | Le Leannec et al. | 382/240 |
| 2008/0069203 A1 | 3/2008 | Karczewicz et al. | |
| 2008/0117214 A1 | 5/2008 | Perani et al. | |
| 2008/0137726 A1 | 6/2008 | Chatterjee et al. | |
| 2008/0151997 A1 | 6/2008 | Oguz | |
| 2008/0285444 A1 | 11/2008 | Diab et al. | |
| 2009/0060277 A1 | 3/2009 | Zhang et al. | |
| 2009/0086827 A1 | 4/2009 | Wu et al. | |
| 2009/0116549 A1 | 5/2009 | Shen et al. | |
| 2009/0122864 A1 | 5/2009 | Palfner et al. | |
| 2009/0161763 A1 | 6/2009 | Rossignol et al. | |
| 2009/0196350 A1 | 8/2009 | Xiong | |
| 2009/0268974 A1 | 10/2009 | Takagi | |
| 2010/0034268 A1 | 2/2010 | Kusakabe et al. | |

FOREIGN PATENT DOCUMENTS

| | | |
|---|---|---|
| GB | 2348559 | 3/1999 |
| JP | 04162893 | 6/1992 |
| JP | 11096138 | 4/1999 |
| JP | 2001184323 | 7/2001 |
| JP | 2005-192232 | 7/2005 |
| JP | 2005354686 | 12/2005 |
| JP | 2006287315 | 10/2006 |
| WO | 9827742 | 6/1998 |
| WO | 0233650 | 4/2002 |
| WO | 2005001625 | 1/2005 |
| WO | 2005096168 | 10/2005 |
| WO | 2006085137 | 8/2006 |

OTHER PUBLICATIONS

"Ralf Schafer et al.,", "H.264/AVC", Dated: Jan. 2003, pp. 1-12.
_The Merriam-Webster Dictionary_. 2005 ed. Springfield, MA: Merriam-Webster Inc., 2005.
3D Graphics Processor for Mobile Set Based on Configurable Processor; Takemoto, Takashi et al., Oct. 22, 2004.
A Single-Chip Video/Audio Codec for Low Bit Rate Application Seongmo Park, Seongmin Kim, Igkyun Kim, Kyungjin Byun, Jin Jong Cha, and Hanjin Cho, ETRI Journal, vol. 22, No. 1, Mar. 2000, pp. 20-29.
Advanced Video Coding for generic audiovisual services, Telecommunication Standardization Sector of ITU, Dated Mar. 2005, pp. 1-343.
Andrew Gibson, "H.264 Video Encoding Standard", year Aug. 2002, pp. 1-98, Queens University Kingston Ontario Canada.
Chen, Hao et al., "Adaptive FMO Selection Strategy for Error Resilient H.264 Coding" International Conference on Audio, Language and Image Processing, 2008. ICALIP 2008, Jul. 7-9, 2008, pp. 868-872.
Hannuksela, Miska et al., "Random Access Using Isolated Regions", IEEE 2003, pp. III-841 to III to 844.
Iwasaki, I.; Naganuma, J.; Nitta, K.; Yoshitome, T.; Ogura, M.; Nakajima, Y.; Tashiro, Y.; Onishi, T.; Ikeda, M.; Endo, M., "Single-chip MPEG-2 422P@HL CODEC LSI with multi-chip configuration for large scale processing beyond HDTV level," Design, Automation and Test in Europe Conference and Exhibition, Mar. 2003.
Jamil-Ur-Rehman and Dr. Zhang Ye, "Efficient Techniques for Signaling Intra Prediction modes of H.264/Mpeg-4 Part 10", Proceedings of the First International Conference on Innovative Computing, Information and Control, ICICIC, Year 2006, pp. 1-4.
Jong, et al., "Accuracy Improvement and Cost Reduction of 3-Step Search Block Matching Algorithm for Video Coding", Feb. 1, 1994, IEEE Transaction on Circuits and Systems for Video Technology, vol. 4 No. 1, pp. 88-90, XP000439487.
Mizuno, M. et al.; "A 1.5-W single-chip MPEG-2 MP@ML video encoder with low power motion estimation and clocking," Solid-State Circuits, IEEE Journal of, vol. 32, No. 11, pp. 18-7-1816, Nov. 1997.
Realization of Low-Bit_Ratio Video Encoder Using Mpact Media Processor; Iwasaki, Junichi et al.; 1997.
Rohini Krishnan, et al., "Design of a 2D DCT/IDCT Application Specific VLIW Processor Supporting Scaled and Sub-sampled Blocks," 16th International Conference on VLSI Design, 2003, six pages.
Shih-Hao Wang et al.; "A platform-based MPEG-4 advanced video coding (AVC) decoder with block level pipelining," Information, Communications and Signal Processing, 2003 and the Fourth Pacific Rim Conference on Multimedia Proceedings of the 2003 Joint Conference of the Fourth International Conference on, vol. 1, No., p. 51-55 vol. 1, Dec. 2003.
Tourapis et al., Proc. of SPIE Conf. Vis. Comm. and Img. Processing, vol. 3, pp. 1365-1373, Jun. 2000.
Tu, C., Liang, J., and Tran, T. "Adaptive Runlength Coding", in_IEEE Signal Processing Letters_vol. 10, No. 3, pp. 61-66. Mar. 2003.
Tung-Chien Chen; Yu-Wen Huang; Liang-Gee Chen, "Analysis and design of macroblock pipelining for H.264/AVC VLSI architecture," Circuits and Systems, 2004. ISCAS '04. Proceedings of the 2004 International Symposium on, vol. 2, No., pp. 11-273-6 vol. 2, May 23-26, 2004.
Zheng, et al., Inter. Conf. Info. Systems, Analysis and Synthesis, SCI 2001—ISAS 2001, vol. 13, 2001.

* cited by examiner

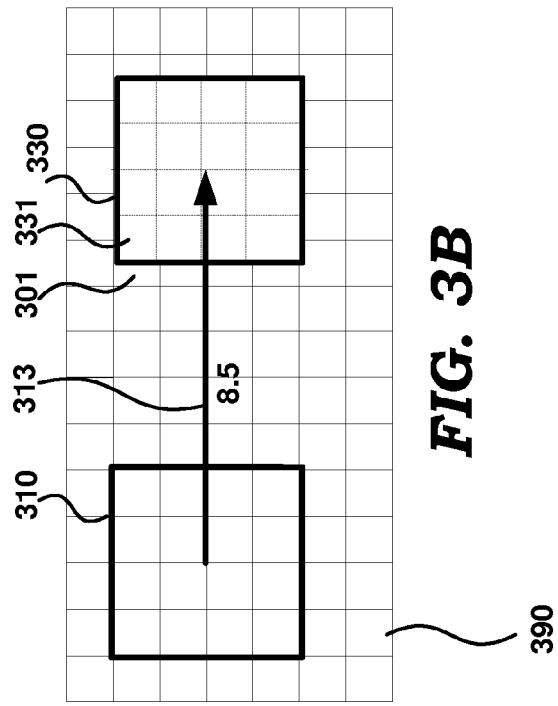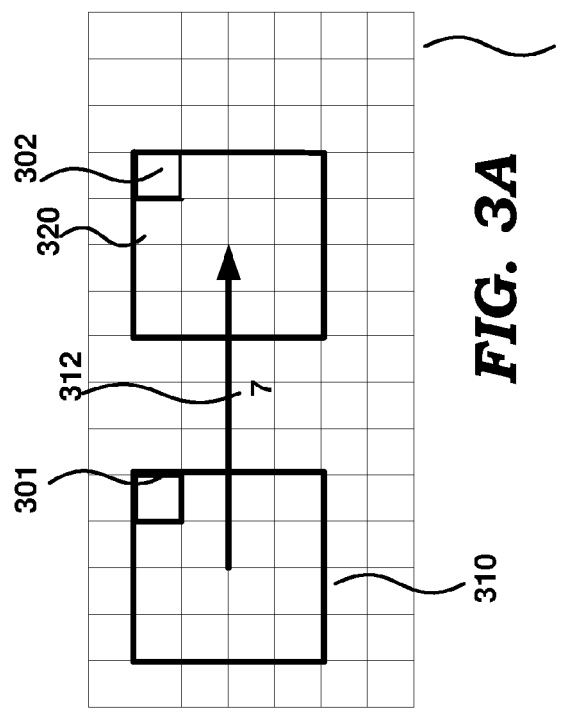

SUB-PIXEL INTERPOLATION AND ITS APPLICATION IN MOTION COMPENSATED ENCODING OF A VIDEO SIGNAL

BACKGROUND

1. Field of Disclosure

The present disclosure relates generally to encoding of video signals, and more specifically to sub-pixel interpolation and its application in motion compensated encoding of a video signal.

2. Related Art

A video signal generally contains a sequence of video frames as is well known in the relevant arts. Each video frame may be represented as multiple pixels having corresponding pixel values, as is also well known in the relevant arts.

There is often a need to encode a video signal at one end and then decode the encoded signals at the other end. Encoding generally refers to converting pixel values of a frame according to an approach (encoding approach) such that the encoded data can be converted back to the original digital values within an acceptable error level. The reconversion is referred to as decoding.

An encoding technique entails predicting a frame and generating a difference from the predicted frame. The difference may be further compressed and sent as an encoded signal. A receiving system also attempts to predict the frame based on prior decoded frames and adds the differences to the locally predicted frame in decoding a received encoded signal.

Motion compensation is a technique employed to attain further compression in generating encoded signals. In general, a frame is logically divided into smaller blocks and a motion vector is generated representing the movement of a block sought to be encoded. The difference values noted above, are based on the blocks moved (of the locally predicted frame).

Assuming the movement is accurately predicted, the difference data would also require fewer bits to represent and thus further compression may be attained in the encoding operation. Thus, there has been a general need to predict the motion vectors accurately. The motion vectors are often specified in terms of pixel positions, and there has been a recognised need to predict the movement to the granularity of sub-pixels.

Supporting the sub-pixel motion estimation requires that the image frame also be generated at sub-pixel granularity, though the hardware (e.g., image sensors) may only generate pixels for each pixel position. That is, it is required that additional pixel values (corresponding to the sub-pixel positions) be generated from the source pixels generated by the sensor (or those generated after suitable further processing for the same positions).

Interpolation has often been used to generate sub-pixel values. Interpolation generally entails processing surrounding values to generate the sub-pixels sought to be computed. In general, it is desirable that interpolation be performed while meeting various criteria such as reduced resource requirements, reduced space on the silicon/wafer and/or reduced time, etc., as suited for the specific environment.

BRIEF DESCRIPTION OF THE DRAWINGS

Example embodiments will be described with reference to the following accompanying drawings, which are described briefly below.

FIGS. 3A-3D illustrates motion vectors, with each vector indicating the movement of a predicted block in comparison to the corresponding source block.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

Overview

An aspect of the present invention reduces the resource requirements in generating sub-pixel values. In an embodiment, the half-pixels along the vertical and/or horizontal directions are computed using a filter one complexity level and then a half pixel in the diagonal direction using a lower complexity filter. Due to the use of the lower complexity filter in computing half pixel in the diagonal direction, the computational and other resource requirements may be reduced in computing the half pixel in the diagonal direction.

According to another aspect of the present invention, such a lower complexity filter is used for motion estimation in which the motion vector for a source block is sought to be predicted. Any sub-pixels at positions pointed to by the estimated motion vector may be computed using higher complexity filters (e.g., that specified by H.264 in case of video encoding) such that the encoded data accurately reflects the source image.

The computational requirements in generating lower resolution sub-pixels (e.g., ¼ pixel or ⅛ pixel or even lower), which require the half pixels in the diagonal direction, may also be reduced as a result. Such reduced computations may be particularly useful while computing the sub-pixel values in real-time and/or when a device/system performing such computations is resource constrained (e.g., low on memory or processing power).

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

2. Example Environment

Figure 1:
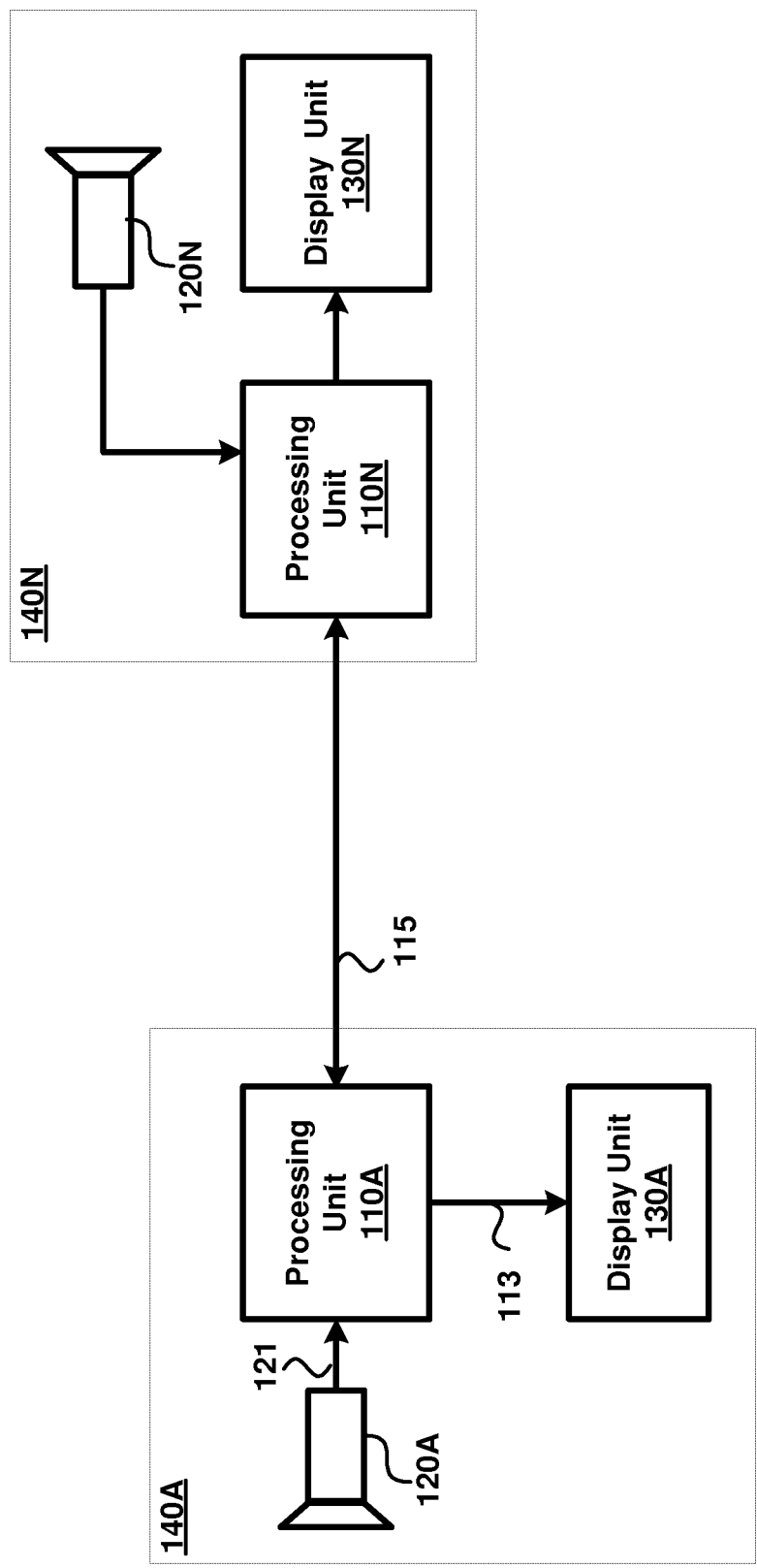
FIG. 1 is a block diagram illustrating an example environment in which several features of the present invention may be implemented.

FIG. 1 is a block diagram illustrating an example environment in which several features of the present invention may be implemented. The example environment is shown containing only representative systems for illustration. However, real-world environments may contain many more systems/components as will be apparent to one skilled in the relevant arts. Implementations in such environments are also contemplated to be within the scope and spirit of various aspects of the present invention.

The diagram is shown containing end systems 140A and 140N designed/configured to communicate with each other in a video conferencing application. End system 140A is shown containing processing unit 110A, video camera 120A and display unit 130A, and end system 140N is shown containing processing unit 110N, video camera 120N and display unit 130N.

End systems 140A through 140N represent example systems implemented according to several aspects of the present invention. Processing unit 110N, video camera 120N and display unit 130N respectively operate similar to the corresponding components of end system 140A, and the description is not repeated for conciseness. Each component of end system 140A is described in detail below.

Video camera 120A captures images of a scene, and forwards the captured image (in the form of corresponding video frames) to processing unit 110A on path 121. Each video frame may be represented by a number of pixel elements (digital values), with each pixel element having one or more color values for a point/portion of the captured image.

Processing unit 110A encodes the pixel elements and generates encoded data. The encoded data is transmitted on transmission path 115. Processing unit 110A may similarly receive encoded data on transmission path from end system 140N. Processing unit 110A decodes the received data and sends the decoded frames for display on display unit 130A.

Both processing units 110A and 110N may thus need to perform both encoding and decoding of data. Merely for ease of description, it is assumed that processing unit 110A encodes data and processing unit 110N decodes the data in the description below.

It may be appreciated that it is desirable to reduce the various resource requirements in the processing units for encoding operations. Several aspects of the present invention enable such an objective to be met as described below in further detail with examples.

In an embodiment, the features are implemented in an encoding system. Accordingly the description is continued with respect to the details of an example encoding approach.

Example Encoding Approach

Figure 2:
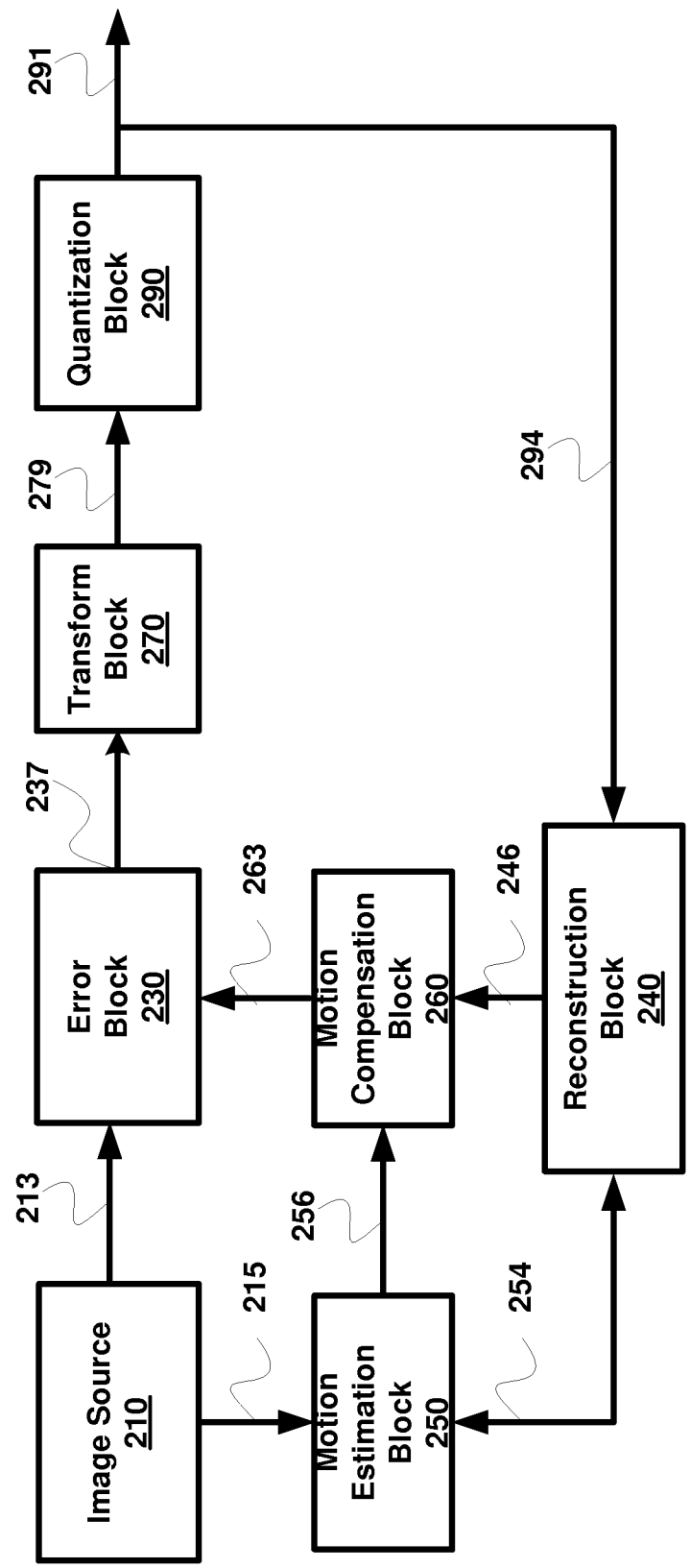
FIG. 2 is a block diagram illustrating an example encoding approach in which several aspects of the present invention can be implemented.

FIG. 2 is a block diagram illustrating an example encoding approach in which several aspects of the present invention can be implemented. The block diagram is shown containing image source 210, error block 230, reconstruction block 240, motion estimation block 250, motion compensation block 260, transform block 270 and quantization block 290. Each of the blocks can be implemented in a combination of one or more of hardware, software and firmware, and is described below in detail.

Only the details as believed to be necessary to understand the operation of the described embodiments are provided herein for conciseness. For further details of the general principles, the reader is referred to documents/books entitled, "H.264 and MPEG-4 Video Compression, Ian Richardson, John Wiley & SONS, September 2003", and "ITU-T, Series H: AUDIOVISUAL AND MULTIMEDIA SYSTEMS—Advanced video coding for generic audiovisual services, March, 2005".

Image source 210 represents a block generating a stream of image frames, with each image frame being represented by a corresponding set of pixel values. Each image frame may be provided in its entirety or as macro-blocks. Each macro-block represents a portion of the image frame and is referred to as a source block. In an embodiment, each macro-block is provided as 16×16 pixels (i.e., 16 pixels in horizontal direction and 16 in vertical direction).

Reconstruction block 240 reconstructs the previously coded image frames received on path 294. Reconstruction block 240 may perform inverse operations (inverse quantization, inverse transform, etc.) corresponding to blocks 290, 270 and 230. Image frames thus reconstructed are provided on paths 246 and 254 (as reconstructed image frames).

Motion compensation block 260 generates a predicted image block corresponding to the source image block (current image block to be encoded) from the reconstructed frame received on path 246 and motion vector received on path 256. Motion compensation block 260 may perform interpolation of pixel/sub-pixels from the received reconstructed frame and the motion vector. In one embodiment, interpolation of pixel/sub-pixels (for motion compensation) is performed according to H.264 standard noted above.

Motion compensation block 260 performs interpolation using higher complexity filters (e.g., that specified by H.264 in case of video encoding as compared to those used in motion estimation described below), to ensure that the image is encoded accurately. However, it may be appreciated that only the sub-pixels as specified by the motion vector in the reconstructed frame may need to be generated using such higher complexity filters.

Error block 230 generates a residue (difference) block, with each data point in the residue block representing the difference of corresponding pixel values of source image block received on path 213 and predicted (compensated) block received on path 263 (each having the same number of pixels). A matrix (residue block) representing the data points is provided on path 237. The difference block may contain the same number of elements (data points) as in the original block.

Transform block 270 transforms the difference (residue) block into a compressed block. In general, the transformation is designed such that the compressed block can be represented by a fewer number of bits compared to those in the difference block (and original block as well). The transformation may be obtained by performing a mathematical operation on the elements of the difference block. In an embodiment, the transformation corresponds to a discrete cosine transformation (DCT) or integer DCT.

Quantization block 290 further digitizes (quantizes) the (individual elements of) compressed block to represent the elements of compressed block with a desired number of bits. It may be appreciated that only fewer bits are needed to represent each element accurately due to the sub-pixel granularity used in motion compensation.

Motion estimation block 250 generates a motion vector indicating the relative displacement between the position of a source block and position of a block (in the reconstructed frame received on path 254) that is closest matching to the received source block (on path 215). The displacement/motion vector often represents the movement of the received source block from the reconstructed (previous) frame. Motion vectors generated by comparison to the source block with blocks that are shifted by a pixel/subpixel positions are illustrated in an example with respect to FIGS. 3A-3D and 4 below.

Motion Estimation

In FIGS. 3A-3D represents the example motion vectors. In each of these Figures, area 390 represents the reconstructed image frame and 310 the source block are conveniently superimposed on the reconstructed image frame to identify the current position in the reconstructed image frame.

Figure 3D:
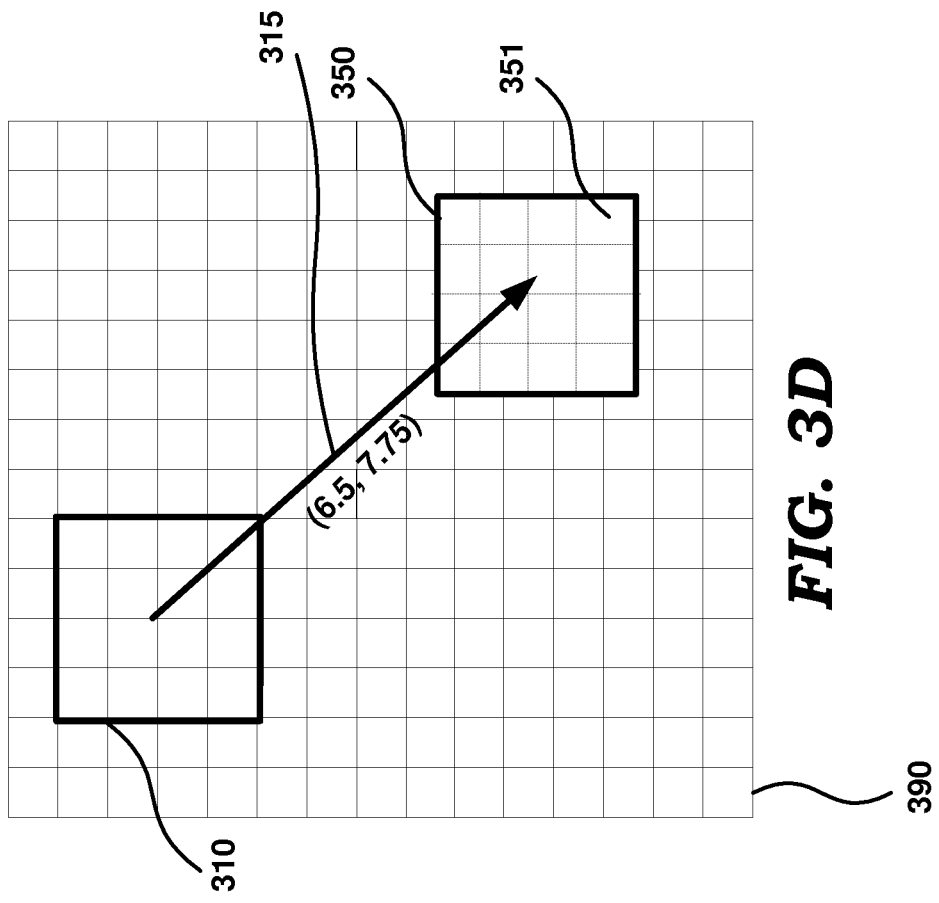

With reference to FIG. 3A, the block 320 represents the closest matching block to source block 310. Accordingly, position vector 312 represents relative position measured (7 pixel horizontal) with respect to a reference pixels (top right pixel 301 and 302 of blocks 310 and 320). Similarly in FIGS. 3B-3D, motion vectors 313-315 (shown as arrows having a tail end and a head end) respectively represent the displacement 8.5 pixels horizontal, 7.25 pixels vertical, and {6.5 horizontal and 7.75 vertical}.

Figure 3C:
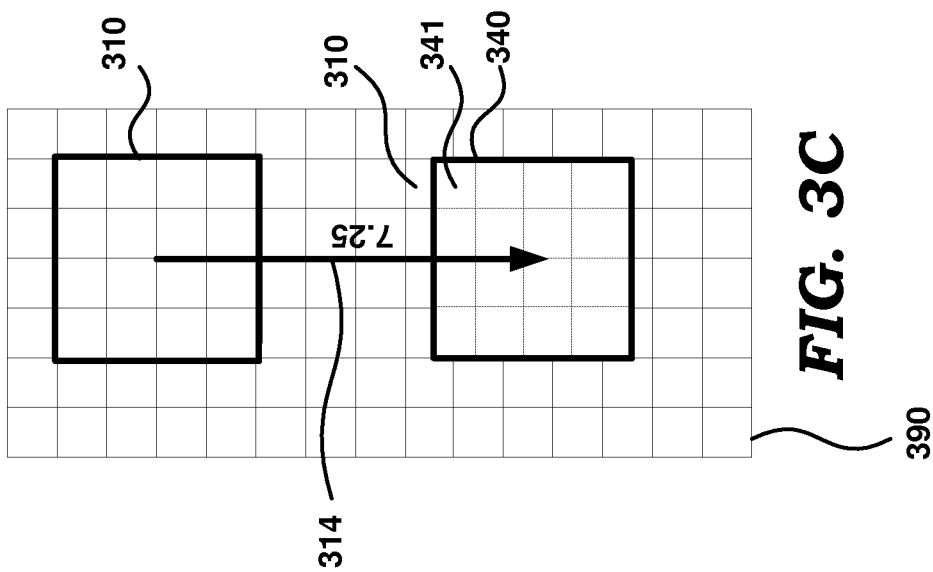

In an embodiment, the fractional displacement/motion vector such as 8.5, 7.25 etc., as depicted in FIGS. 3B-3C, is determined first at integer pixel granularity (i.e., ignoring the sub-pixel or fraction precision) and then search is conducted (to place the head end of the motion vector) at sub-pixel level (precision) by interpolating sub-pixel values at sub-pixel positions, around the area pointed by the integer motion vector to form the final motion vector with the sub-pixel precision. Various sub-pixel positions around an integer pixel are illustrated in FIG. 4.

Figure 4:
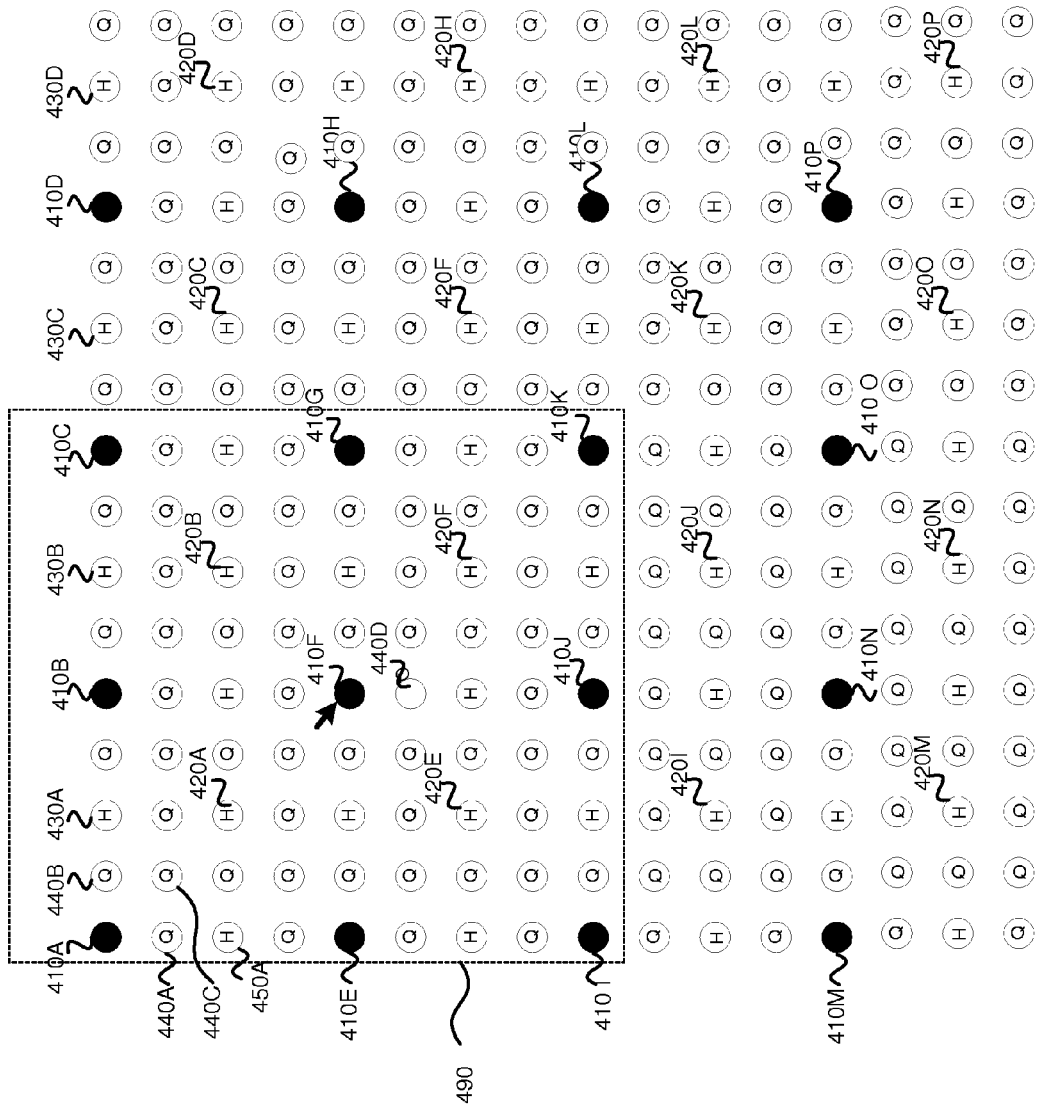
FIG. 4 is a diagram illustrating example sub-pixel positions around an integer pixel.

FIG. 4 is a diagram illustrating example sub-pixel positions around an integer pixel. In the diagram, dark points 410A-410P represent integer pixel positions of the reconstructed block and remaining sub-pixels positions without dark shading represents sub-pixel positions. Sub-pixels shown with labeled H (e.g., 420A-420P, 430A-430D and 450A) which are halfway (in either horizontal, vertical or diagonal directions) from the integer pixels are referred to as half pixels. Sub pixels marked Q which are quarter distance from half pixels or integer pixels are referred to as quarter pixels (e.g., 440A-440C).

Continuing with reference determination of fraction motion vector/displacement, assuming a integer position vector represents position of integer pixel 410F, the sub-pixel positions (representing sub-pixel position/motion vectors) within area 490 represents the search area for determining the sub-pixel motion vector. Area 490 represents the different sub-pixel positions (sub-pixel position/motion vector) at which the source block can be referenced. (in FIG. 4 the source block is shown referenced at integer pixel 410F). Accordingly, for each of the sub pixel position in area 490, a set of sub-pixels for every integer pixels 410A-410P are interpolated. For example, if the selected sub-pixel position (sub-pixel position/motion vector) represents 420A, then half pixels 420A-420P corresponding to integer pixels 410A-410P are interpolated and used for matching with the source block.

Accordingly, during sub-pixel motion estimation, 16 sub-pixels (corresponding to 16 integer pixels) are interpolated (at relative distance) for each sub-pixel position (for each sub-pixel motion vector) in area 490.

Sub-pixels are generated using interpolation techniques according to various aspects of the present invention. Interpolation is performed using 'filters' which refers to blocks that receive a number of inputs and performs a mathematical operation (for the desired interpolation) on the inputs.

The mathematical operation is often implemented as a matrix multiplication of N-dimensions, with N being referred to as the number of taps of the corresponding filter. Usage of more taps generally implies more computational complexity.

Each filter can be implemented in a combination of one or more of hardware, software and firmware.

It is generally desirable that interpolation during sub-pixel motion estimation be performed with reduced computational complexity (fewer taps) so as to reduce the resource requirements. At the same time, the operations need to be performed while attaining reasonable level of accuracy (to represent the scene). The manner in which such requirements can be balanced is described below with an example.

Reducing Computational Complexity

Figure 5:
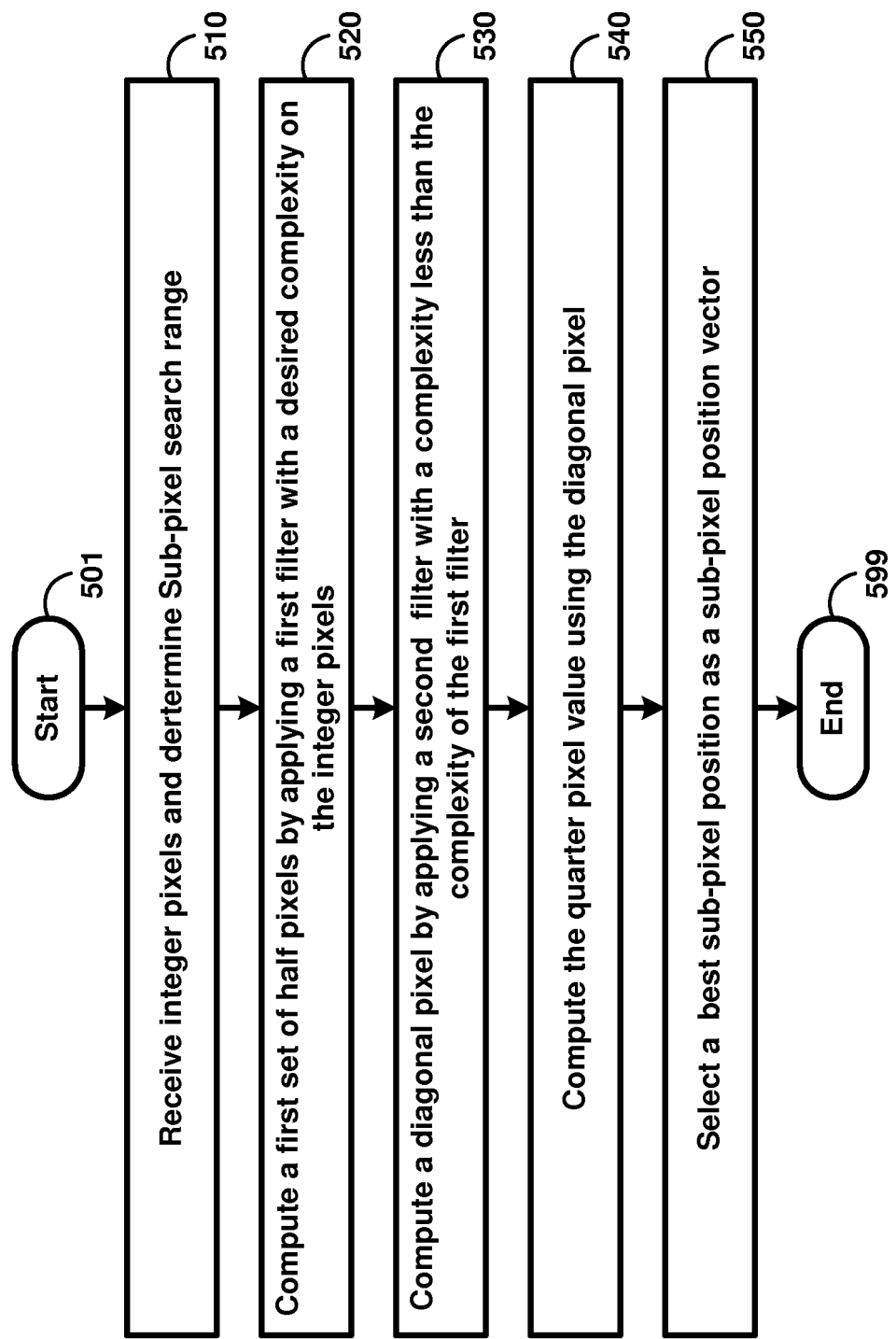
FIG. 5 is a flowchart illustrating the manner in which interpolation is performed with reduced computational complexity in one embodiment.

FIG. 5 is a flowchart illustrating the manner in which sub-pixel interpolation is performed with reduced computational complexity in one embodiment. The flowchart is described with respect to FIGS. 1-2 and 4 merely for illustration. However, the features can be implemented in other environments as well. In addition, the steps can be implemented in a different sequence than that of the flowchart. The flowchart starts in step 501, in which control passes to step 510.

In step 510, motion estimation block 250 receives integer pixels from reconstruction block 240 and determines the sub-pixel search range. Based on the received integer pixels, motion estimation block 250 may generate an integer motion vector representing an integer pixel position. A search range for sub-pixel motion vector may be determined based on the desired complexity and desired accuracy in determining a sub-pixel motion vector. With reference to FIG. 4 motion estimation block 250 determine a motion vector (shown with arrow) representing the integer pixel position 410F. Accordingly a sub-pixel search 490 is selected. Integer pixels 410A-410P represents some of the integer pixels received.

In step 520, motion estimation block 250 computes a first set of half pixels by applying a first filter with a desired complexity on the integer pixels. As noted above, the complexity is measured by a number of taps used for the filter. Any previously computed half pixels may also be used in combination with the integer pixels in computing the first set of half pixels.

In step 530, motion estimation block 250 computes a diagonal half pixel (e.g., 420E) by applying a second filter with a complexity less than the complexity of the first filter. The second filter may be applied on the half pixels computed in step 520 and/or integer pixels. The diagonal half pixel represents an example of a second set of pixels.

In step 540, motion estimation block 250 computes quarter pixel values using the diagonal half pixel, in addition to any other desired pixels. Since the diagonal half pixel is computed with reduced computational complexity, the quarter pixels are also computed with correspondingly lower computational complexity.

In step 550, motion estimation block 250 selects the best sub-pixel location (sub-pixel motion vector) within the region 490. In an embodiment, sub pixel motion vector is selected based on the cost of encoding associated with each sub-pixel motion vector as described in sections below. The flowchart ends in step 599.

Due to the use of the lower complexity filters in step 530, the computational complexity is reduced for the half pixels of step 530, and any other sub-pixels computed there from later. On the other hand, due to the use of higher complexity filters in step 520 as compared to those used in step 530, the accuracy of the sub-pixels may be enhanced.

The features of FIG. 5 can be implemented in various embodiments. The description is continued with respect to an example embodiment.

Interpolation of Half and Quarter Pixel Positions

Figure 6:
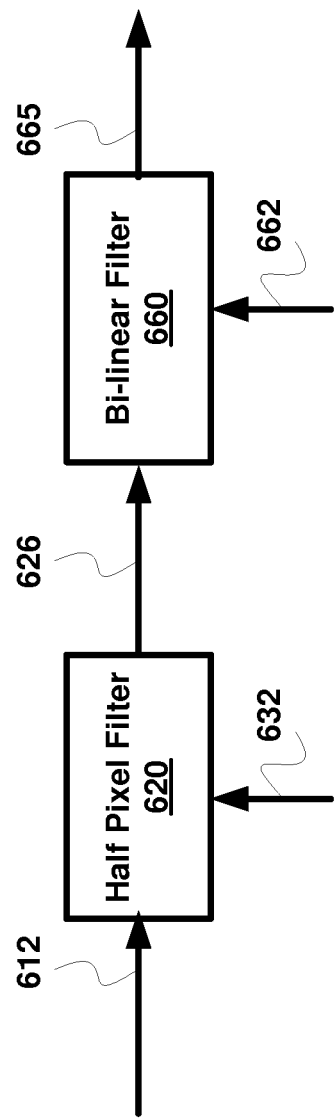
FIG. 6 is a block diagram illustrating the interpolation of quarter pixels for sub-pixel motion estimation in an embodiment of the present invention.

FIG. 6 is a block diagram illustrating the interpolation of quarter pixels for sub-pixel motion estimation in an embodiment of the present invention. The block diagram is shown containing half pixel filter 620 and bilinear filter 660. The block diagram is described below with reference to FIG. 4, 5 and FIG. 7 merely for illustration.

Half pixel filter 620 computes/generates first set of half pixels and diagonal half pixel according to steps 520 and 530. Half pixel filter 620 may use integer pixels and previously computed half pixels respectively received on paths 612 and 632. The computed first set of half pixels and diagonal half pixel are provided on path 626 to bilinear filter 660.

Bilinear filter 660 receives the first set of half pixels, diagonal half pixel on path 626 and integer pixels on path 662 and generates quarter pixels according to step 540.

Figure 7:
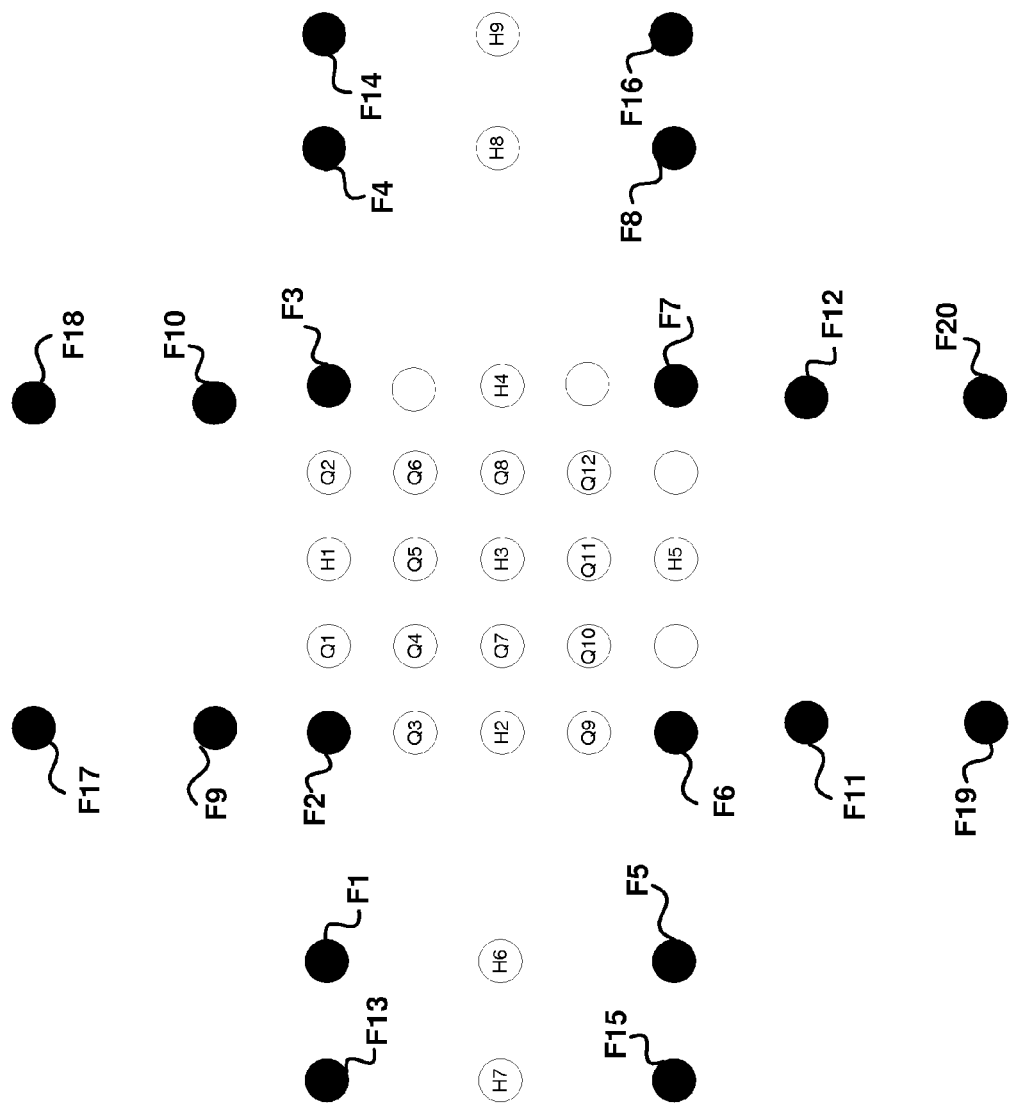
FIG. 7 depicts example pixel locations for computation.

The manner in which half pixel filter 620 and bilinear filter 660 are implemented in an embodiment of the present invention is described below with example pixel locations depicted in FIG. 7. Shown there are integer pixels F1 through F20, Half pixels H1 through H5 and quarter pixels Q1 through Q12.

Half pixel filter 620 computes half pixels H1, H2, H4, and H5 using a four tap filter with filter coefficient represented as h1=[−1, 5, 5, −1]/8. However other four tap filters such as h2=[−1, 9, 9, −1]/16, h3=[−1, 17, 17, −1]/32 may be employed. Accordingly, Half pixels H1 may be computed as:

$$H1=(-1*F1+5*F2+5*F3+F4*-1+4)/ \qquad \text{Equation (1).}$$

Similarly H5 may be computed as:

$$H5=(-1*F5+5*F6+5*F7+F8*-1+4)/ \qquad \text{Equation (2).}$$

The diagonal pixel H3 is computed using a bilinear filter as:

$$H3=(H1+H5+1)/2 \qquad \text{Equation (3).}$$

H3 may also be computed using a horizontal adjacent half pixels H2 and H4 as noted below.

$$H2=(HI2+4)/8 \qquad \text{Equation (4)}$$

wherein HI2 represents a non normalised value of H2 and computed as:

$$HI2=-1*F9+5*F2+5*F6+F11*-1 \qquad \text{Equation (5).}$$

Similarly the H4 is computed as:

$$H4=(HI4+4)/8 \qquad \text{Equation (6)}$$

wherein HI4 represents a non normalised value of H4 and computed as $$HI4=-1*F10+5*F3+5*F7+F12*-1 \qquad \text{Equation (7).}$$

The Diagonal Value H3 is computed using horizontal half pixels as:

$$H3=(HI2+HI4+8)/16 \qquad \text{Equation (8)}$$

or $$H3=(H2+H4+1)/2 \qquad \text{Equation (9).}$$

From the above equations, it may be appreciated that half pixel filter 620 computes H3 using a filter having two taps less than the filters in Equation 1, 2, 5 and 7 used for computing first set of half pixels. The computed half pixels are provided to bilinear filter 660.

Bilinear filter 660 receives the half pixels values and integer pixel values and computes the quarter pixels Q1-Q12 as:

$$Q1=(F2+H1+1)/2$$

$$Q2=(H1+F3+1)/2$$

$$Q3=(F2+H2+1)/2$$

$$Q4=(H1+H2+1)/2$$

$$Q5=(H1+H3+1)/2$$

$$Q6=(H1+H4+1)/2$$

$$Q7=(H2+H3+1)/2$$

$$Q8=(H3+H4+1)/2$$

$$Q9=(H2+F6+1)/2$$

$$Q10=(H2+H5+1)/2$$

$$Q11=(H3+H5+1)/2$$

$$Q12=(H4+H5+1)/2$$

It may be appreciated that, Quarter pixels Q5, Q7, Q8 and Q11 are computed using diagonal pixel H3, the computation complexity in computing these pixels is further reduced. The quarter pixels are provided on path 665 for further processing.

While the description above is provided assuming that four tap and two tap filters are respectively used for the first set of half-pixels and the diagonal half sub-pixel, other complexity filters can also be employed without departing from the scope and spirit of several aspects of the present invention. For example, Equations 1, 2, 5 and 7 may be replaced with a respective 6 tap filter with filter coefficients represented as h4=[1, −5, 20, 20, −5, 1]/32 and Equation 8 and 9 may be replaced with a four tap (with coefficients represented as h1=[−1, 5, 5, −1]/8 or h2=[−1, 9, 9, −1]/16 or h3=[−1, 17, 17, −1]/32) or a two tap filter. The filter coefficients of a two tap filter may be represented as h5=[1, 1]/2.

Selection of Optimal Sub-Pixel Motion Vector

Figure 8A:
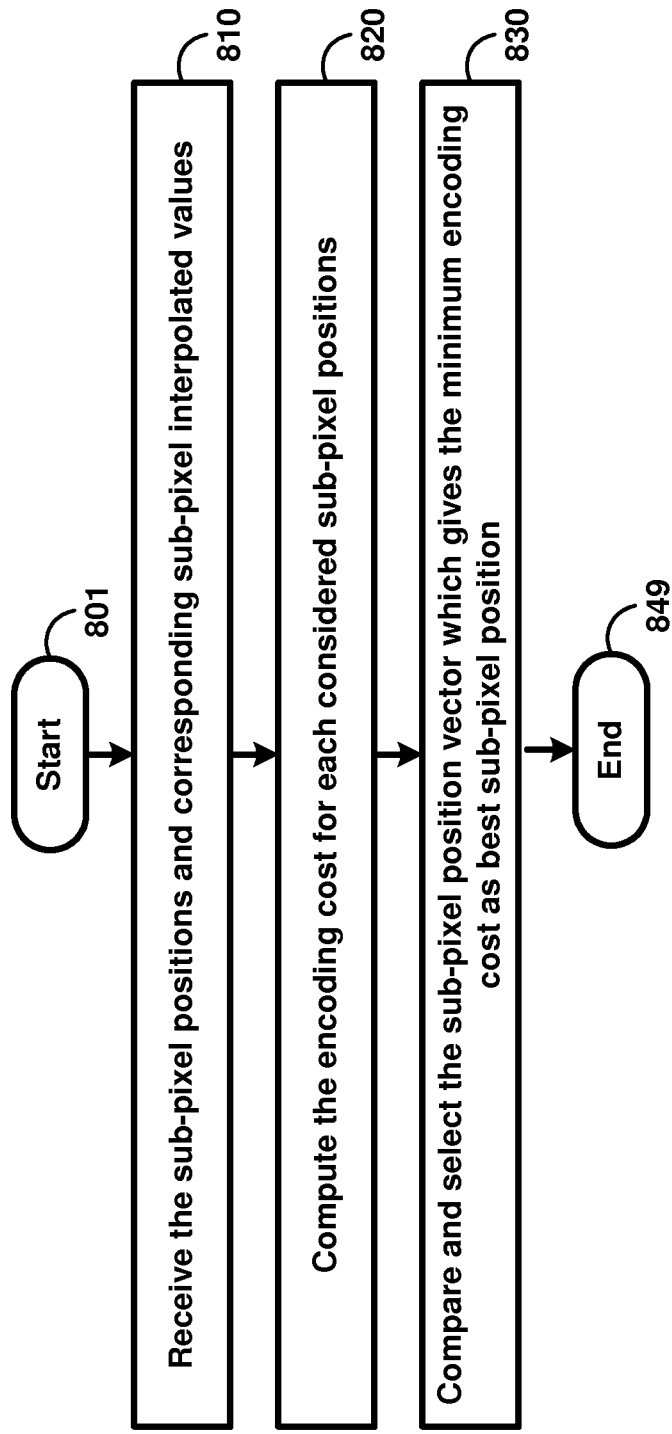
FIG. 8A is a flowchart illustrating the selection of optimal sub-pixel motion vectors in an embodiment of the present invention.

FIG. 8A is a flowchart illustrating the selection of optimal sub-pixel motion vectors in an embodiment of the present invention. The flowchart is illustrated with respect to FIGS. 2, 4 and 5 merely for illustration. However, the features can be implemented in other environments as well. In addition, the steps can be implemented in a different sequence than that of the flowchart. The flowchart begins in step 801 and control passes to step 810.

In step 810, motion estimation block 250 computes the sub-pixel positions and corresponding sub-pixel interpolated values (interpolated block) from the reconstructed frame. The sub-pixel positions and the corresponding interpolated sub-pixel values are computed according to several aspects of the present invention described with reference to FIG. 5.

In step 820, motion estimation block 250 computes the encoding cost for each of the considered sub-pixel positions (within area 490). In one embodiment of the present invention the encoding cost E for each sub-pixel position/motion vector is computed as:

$$E=D+\text{Lambda1}*R1+\text{Lambda2}*R2+\text{Lambda3}*R3+ \\ \text{FilterCorrectionBias} \qquad \text{Equation (10)}$$

wherein, D represents error/difference between the source (current) blocks to be coded and interpolated blocks computed in step 810, R1 represents bits needed to code residual Error, R2 represents bits needed to code the current macro block motion vectors, R3 represents bits needed to code the different macro block mode. (e.g., 16×16, 16×18, 8×16, 8×8, 8×4, 4×8, 4×4) and other macro block mode information Lambda1, Lambda2 and Lambda3 respectively represent weighting factor for R1, R2 and R3.

FilterCorrectionBias equals 0 if the standard filters (higher complexity in step 520) are used in computing E, and equals a non-zero value otherwise. The bias value has a negative correlation with the complexity of the filter used in steps 530 (i.e., a higher bias value in case of lower complexity filter).

In step 830, motion estimation block 250 compares and selects the sub-pixel position vector which gives the minimum encoding cost as best sub-pixel position as noted in step 550. Flowchart ends in step 849.

If the selected sub-pixel position in step 830 corresponds to a sub-pixel position (diagonal half pixels or the quarter pixel depending on the diagonal half pixels) computed using low complexity filters (according to step 530/540), cost of encoding may be recomputed as described below to reduce any error due to the low complexity filters incorporated.

Figure 8B:
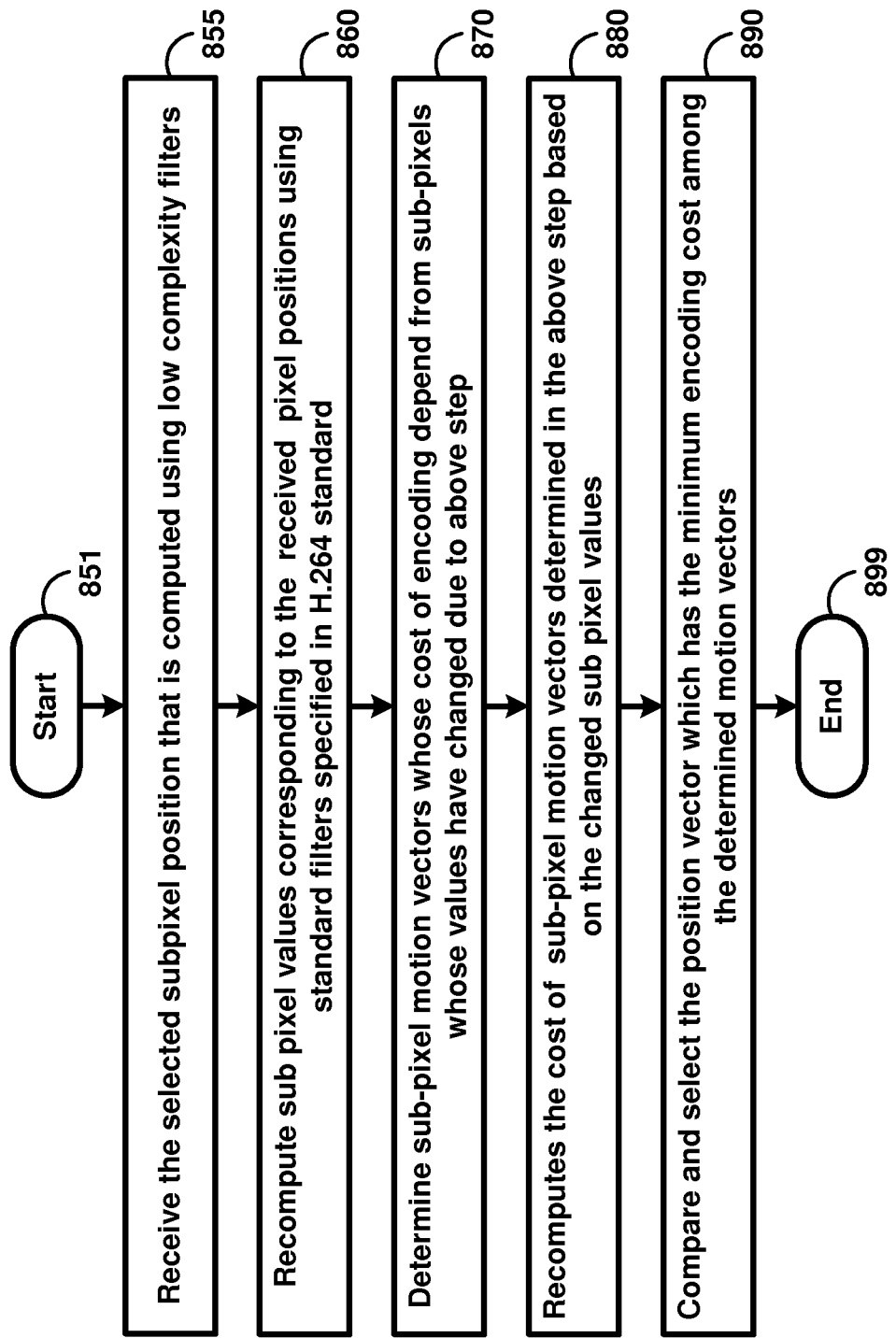
FIG. 8B is a flowchart illustrating the computation of encoding cost if the selected sub-pixel position/motion vector corresponds to a diagonal half pixel/the quarter pixels depending from the diagonal half pixels.

FIG. 8B is a flowchart illustrating the computation of encoding cost if the selected sub-pixel position/motion vector corresponds to a diagonal half pixel/the quarter pixels depending from the diagonal half pixels in an alternative embodiment of the present invention. Flow chart begins in step 851 and control passes to step 855.

In step 855, motion estimation block 250 receives the selected sub pixel positions that are computed using low complexity filters. The diagonal half-pixel represents an example of such received sub-pixel position.

In step 860, motion estimation block 250 recomputes sub pixel values corresponding to the received pixel positions using standard filters as specified in H.264 standard (i.e., higher complexity filter, which provides more precision). As a result, several of the sub-pixels values are changed from the values computed in steps 530 and 540.

In step 870, motion estimation block 250 determines sub-pixel motion vectors whose cost of encoding depends from sub-pixels whose values have changed due to step 860. That is, each motion vector is formed by placing the corresponding head on the sub-pixel, whose value is changed.

In step 880, motion estimation block 250 re-computes the cost associated with the sub-pixel motion vectors determined in step 870 based on the changed sub pixel values in step 860.

In step 890, motion estimation block 250 compares and selects the position vector which has the minimum encoding cost. Motion estimation block 250 may exclude sub-pixel positions computed using low complexity filter and consider only the sub-pixel positions that are computed using only a higher complexity filters (standard specified or filter of first complexity level) while comparing the costs in step 890. The flowchart ends in step 899.

As an illustration, with respect to FIG. 4, if the selected subpixel position of step 830 corresponds to 420F (which was computed using the lower complexity filter noted above), the values of the sub-pixels associated with sub-pixel position/motion vector 420F are recomputed as per the standard filters, as a result of this some or all of the sub-pixel values associated with sub-pixel position/motion vector 420A, 420B and 420 E etc., (which are earlier computed based on 420F) get recomputed as per the standard filters and thus the corresponding (sub) pixel values are changed in step 860 and 870. For ease of explanation, it is now assumed that only the pixel values associated with sub-pixel position/motion vector 420A, 420B, 420E and 420F are recomputed.

Now the cost of encoding corresponding to these four positions (i.e., assuming the head end of the motion vector falls in the corresponding position) is recomputed and compared with the costs associated with all the considered pixel and sub-pixel positions within area (490) except the positions that depended from (i.e., used as inputs to filter in the corresponding computation) 420A, 420B, 420E, and 420F are excluded. An example of such excluded sub pixel position/motion vectors are the quarter pixel positions adjacent (immediate) to diagonal pixels in horizontal and vertical directions. As a result, error due to low complexity filters is further reduced during estimation at a negligible increase in complexity.

When cost is of primary consideration, the implementation is performed more in software (e.g., using a processor executing instructions provided in software/firmware). Cost and performance can be balanced by implementing the systems with a desired mix of hardware, software and/or firmware. An embodiment implemented substantially in software is described below.

Software Implementation

Figure 9:
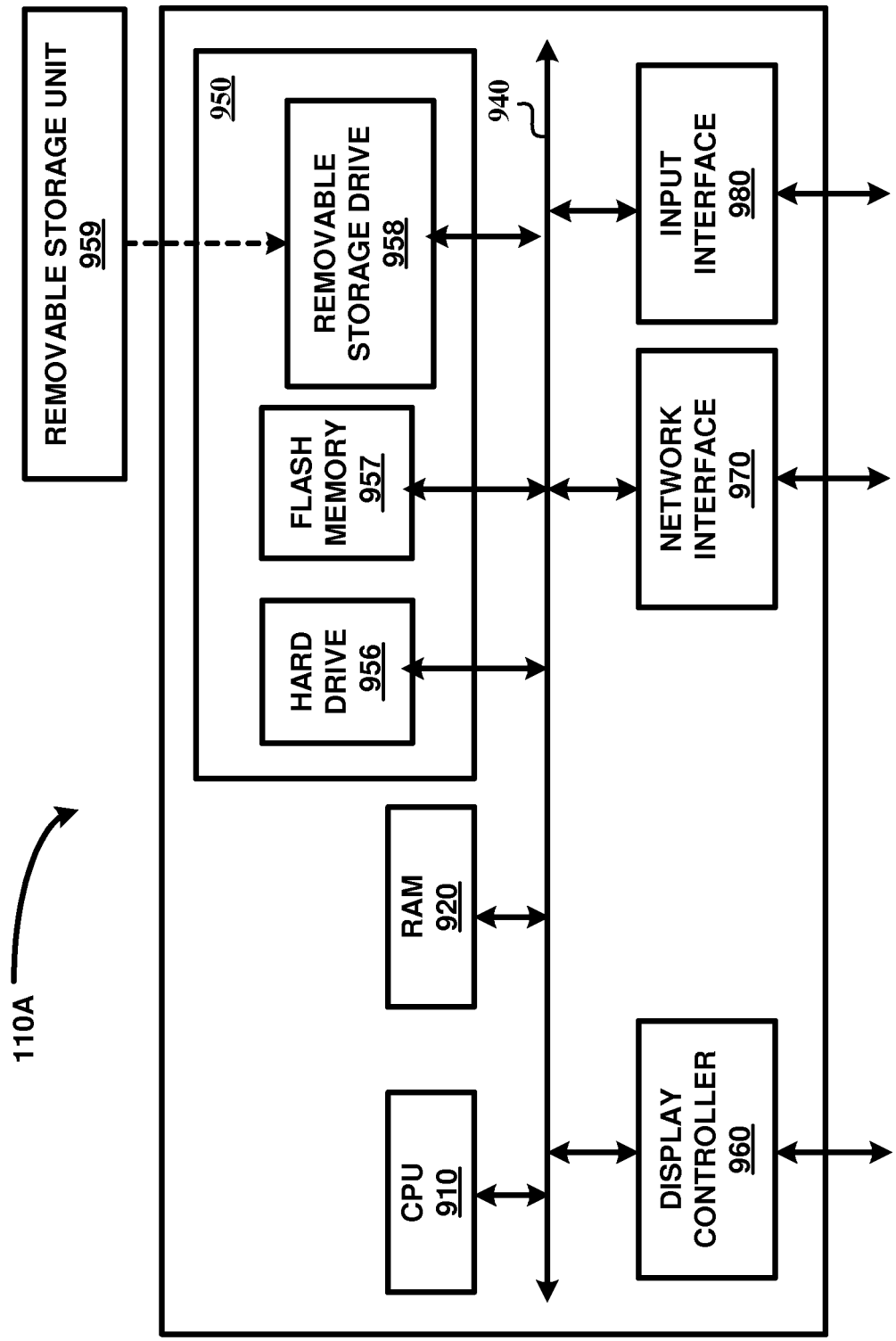
FIG. 9 is a block diagram illustrating the details of a processing unit in another embodiment.

FIG. 9 is a block diagram illustrating the details of processing unit 110A in another embodiment. Processing unit 110A may contain one or more processors such as central processing unit (CPU) 910, random access memory (RAM) 920, secondary storage unit 950, display controller 960, network interface 970, and input interface 980. All the components may communicate with each other over communication path 940, which may contain several buses as is well known in the relevant arts. The components of FIG. 9 are described below in further detail.

CPU 910 may execute instructions stored in RAM 920 to provide several features of the present invention. CPU 910 may contain multiple processing units, with each processing unit potentially being designed for a specific task. Alternatively, CPU 910 may contain only a single general purpose processing unit. RAM 920 may receive instructions from secondary storage unit 950 using communication path 940. In addition, RAM 920 may store video frames received from a video camera during the interpolation operations noted above.

Display controller 960 generates display signals (e.g., in RGB format) to display unit 130A (FIG. 1) based on data/instructions received from CPU 910. Display controller 960 may correspond to display unit 130A in FIG. 1.

Network interface 970 provides connectivity to a network (e.g., using Internet Protocol), and may be used to receive/transmit coded video/data frames. Network interface 970 may correspond to path 115 of FIG. 1. Input interface 980 may include interfaces such as keyboard/mouse, and interface for receiving video frames from video camera 120A.

Secondary storage unit 950 may contain hard drive 956, flash memory 957, and removable storage drive 958. Some or all of the data and instructions may be provided on removable storage unit 959, and the data and instructions may be read and provided by removable storage drive 958 to CPU 910. Floppy drive, magnetic tape drive, CD_ROM drive, DVD Drive, Flash memory, removable memory chip (PCMCIA Card, EPROM) are examples of such removable storage drive 958. Alternatively, data and instructions may be copied to RAM 920 from which CPU 910 may execute. Groups of software instructions (for example, in compiled/object form or post linking in a form suitable for execution by CPU 910) are termed as code.

Removable storage unit 959 may be implemented using medium and storage format compatible with removable storage drive 958 such that removable storage drive 958 can read the data and instructions. Thus, removable storage unit 959 includes a computer readable storage medium having stored therein computer software and/or data.

In general, the computer (or generally, machine) readable medium refers to any medium from which processors can read and execute instructions. The medium can be randomly accessed (such as RAM 920 or flash memory 957), volatile, non volatile, removable or non removable, etc. While the computer readable medium is shown being provided from within processing unit 110A for illustration, it should be appreciated that the computer readable medium can be provided external to processing unit 110A as well.

In this document, the term "computer program product" is used to generally refer to removable storage unit 959 or hard disk installed in hard drive 956. These computer program products are means for providing software to CPU 910. CPU 910 may retrieve the software instructions, and execute the instructions to provide various features (interpolation and sub pixel motion estimation) of the present invention described above.

CONCLUSION

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method comprising:
   receiving a plurality of source integer pixels and a plurality of reconstructed pixels;
   computing an integer motion vector based on said plurality of course integer pixels and said plurality of reconstructed pixels;
   determining a search range about an integer pixel position pointed to by said integer motion vector;
   computing non-diagonal pixels by applying a first filter on a set of said plurality of course integer pixels with said search range, wherein said first filter has a predetermined complexity;
   computing one or more diagonal sub-pixels by applying a second filter on said non-diagonal sub-pixels, wherein said second filter has a complexity less than said predetermined complexity, wherein said one or more diagonal sub-pixels are diagonally half distance from pairs of plurality of integer pixels;
   selecting a vector sub-pixel location based on a cost associated with sub-pixel motion vector encoding of each sub-pixel;
   determining if said sub-pixel at said selected vector sub-pixel location was computed by a filter having a complexity less than said predetermined complexity;
   re-computing one or more sub-pixels including at said selected sub-pixel location using said first filter having said predetermined complexity, if said sub-pixel at said selected sub-pixel location was previously computed by a filter having a complexity less than said predetermined complexity;
   re-selecting a vector sub-pixel location based on a cost associated with sub-pixel motion vector encoding for each sub-pixel using any re-computed sub-pixel, if said sub-pixel at said selected sub-pixel location was previously computed by a filter having a complexity less than said predetermined complexity;
   iteratively repeating said re-computing one or more sub-pixels and said re-selecting said vector sub-pixel location until a sub-pixel at said re-selected vector sub-pixel location was computed by said first filter having said predetermined complexity; and
   computing a motion vector for a final selected vector sub-pixel location, wherein said final selected vector sub-pixel location was computed by said first filter having said predetermined complexity.

2. The method of claim 1, wherein said non-diagonal sub-pixels comprise H1 and H2, and a diagonal sub-pixel (H3) is computed to equal (H1+H2+1)/2.

3. The method of claim 2, wherein both H1 and H2 are located halt pixel distance away on either side of said diagonal sub-pixel.

4. The method of claim 1, wherein said one or more diagonal sub-pixels are further computed by applying said second filter on a pair of said plurality of source integer pixels.

5. The method of claim 1, further comprising generating a plurality of quarter pixels from said one or more diagonal sub-pixels, said non-diagonal sub-pixels and said plurality of source integer pixels.

6. A non-transitory computer readable medium carrying one or more sequences of instructions for causing a receiver system to process a sequence of video frames, wherein execution of said one or more sequences of instructions by one or more processors contained in said received system causes said one or more processors to perform the actions of:
   receiving a plurality of source integer pixels and a plurality of reconstructed pixels;
   computing an integer motion vector based on said plurality of course integer pixels and said plurality of reconstructed pixels;
   determining a search range about an integer pixel position pointed to by said integer motion vector;
   computing non-diagonal pixels by applying a first filter on a set of said plurality of course integer pixels with said search range, wherein said first filter has a predetermined complexity;
   computing one or more diagonal sub-pixels by applying a second filter on said non-diagonal sub-pixels, wherein said second filter has a complexity less than said predetermined complexity, wherein said one or more diagonal sub-pixels are diagonally half distance from pairs of plurality of integer pixels;
   selecting a vector sub-pixel location based on a cost associated with sub-pixel motion vector encoding of each sub-pixel;
   determining if said sub-pixel at said selected vector sub-pixel location was computed by a filter having a complexity less than said predetermined complexity;
   re-computing one or more sub-pixels including at said selected sub-pixel location using said first filter having said predetermined complexity, if said sub-pixel at said selected sub-pixel location was previously computed by a filter having a complexity less than said predetermined complexity;
   re-selecting a vector sub-pixel location based on a cost associated with sub-pixel motion vector encoding for each sub-pixel using any re-computed sub-pixel, if said sub-pixel at said selected sub-pixel location was previously computed by a filter having a complexity less than said predetermined complexity;
   iteratively repeating said re-computing one or more sub-pixels and said re-selecting said vector sub-pixel location until a sub-pixel at said re-selected vector sub-pixel location was computed by said first filter having said predetermined complexity; and
   computing a motion vector for a final selected vector sub-pixel location, wherein said final selected vector sub-pixel location was computed by said first filter having said predetermined complexity.

7. The non-transitory computer readable medium of claim 6, wherein said non-diagonal sub-pixels include a first half pixel (H1) and a second half pixel (H2), and a first diagonal sub-pixel (H3) is computed to equal (H1+H2+1)/2.

8. The non-transitory computer readable medium of claim 6, wherein said reselecting excludes the costs associated with sub-pixels computed using said second filter.

9. The non-transitory computer readable medium of claim 6, further comprising:
   generating a motion compensated block from said plurality of reconstructed pixels at positions corresponding to said motion vector.

\* \* \* \* \*